Oct. 6, 1931.     J. B. THOMPSON     1,826,155
METHOD OF MAKING LINOLEUM
Filed Aug. 11, 1930
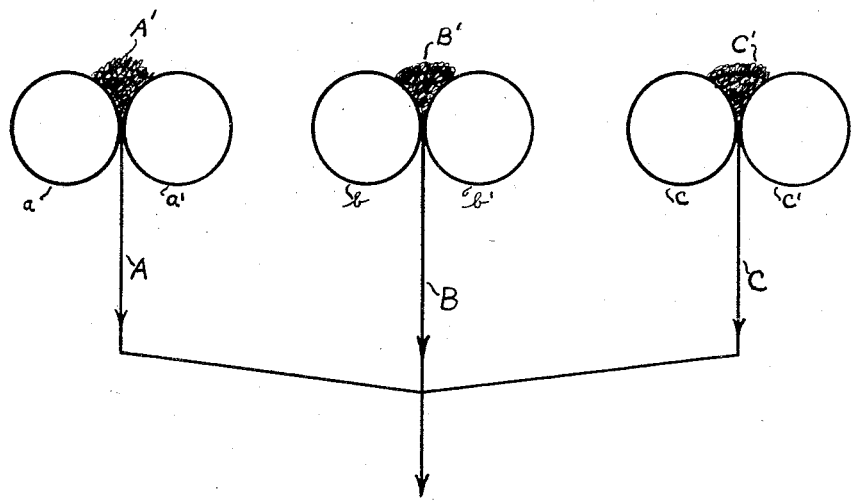
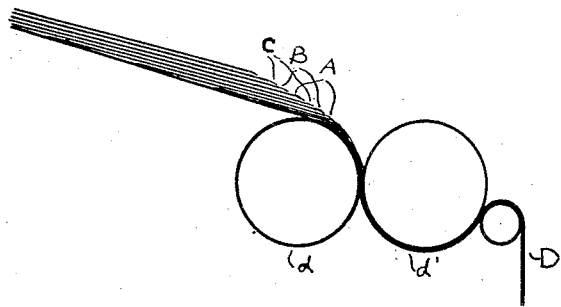
INVENTOR
John B Thompson
BY Gordon C Willard
ATTORNEY Patented Oct. 6, 1931

1,826,155

UNITED STATES PATENT OFFICE

JOHN B. THOMPSON, OF KEARNY, NEW JERSEY, ASSIGNOR TO CONGOLEUM-NAIRN, INC., A CORPORATION OF NEW YORK

METHOD OF MAKING LINOLEUM

Application filed August 11, 1930. Serial No. 474,404.

The present invention relates to the manufacture of linoleum and more particularly to the manufacture of sheets of linoleum composition or the like in which variously colored linoleum composition is combined to produce a variegated appearance.

The chief object of the invention is to provide a novel method of producing, from plastic material, a sheet of continuous indefinite length having a uniform variegated effect from end to end, and adapted to be employed in the well-known automatic inlaying machines of the Walton or Batten type.

Broadly, the method of my invention comprises forming a plurality of series of differently colored primary sheets of linoleum composition or the like, the primary sheets of each series being of the same coloring but differing from the coloring of the primary sheets of another series; positioning, in predetermined order, primary sheets selected from the respective series, in superimposed overlapping relation; maintaining a continuous supply of said overlapping primary sheets; and consolidating the overlapping primary sheets to form a continuous variegated sheet.

In the drawing I have illustrated diagrammatically the manner of carrying out the invention and I will now describe in detail the preferred method.

Primary sheets A, B, and C are first formed from plastic linoleum compositions A′, B′, and C′ by means of a plurality of pairs of calender rolls $a$—$a'$, $b$—$b'$ and $c$—$c'$. As produced, each primary sheet is of continuous indefinite length, being subsequently severed into units of predetermined size to provide a continuous succession of individual primary sheets. One dimension of the unit sheet will approximate the width of the final composite sheet to be produced, while the other dimension is selected to provide a unit sheet which may be readily manipulated. Thus, where the final sheet is approximately six feet in width, the unit primary sheet may be 6½ feet by 3 feet.

Each primary sheet or series of successive individual primary sheets is of uniform coloring distinct from the coloring of the other primary sheets or series of sheets. Preferably, but not necessarily, each sheet is mono-colored. Thus, the primary sheets A and likewise the composition A′ from which they are formed may be of a light green color, primary sheets B and the composition B′ from which they are formed may be of a dark green color, and primary sheets C and the composition C′ from which they are formed may be of an intermediate shade or color of green. In some cases, one or more series of primary sheets may be variegated, particularly where such sheets are formed from reject composition as hereinafter described.

The differently colored primary sheets of the respective series formed as above described are next positioned in superimposed overlapping relation to provide a continuous indefinite succession of overlapped sheets. Preferably, one sheet from each series is arranged in predetermined order with sheets selected from each of the other series and the arrangement repeated indefinitely. The overlapping relation of the successive sheets is such that only a narrow marginal edge of each sheet is exposed—for example—one to two inches. This necessitates the formation of primary sheets of relatively thin gauge in order that the pile of overlapped sheets will not be excessively thick and may be satisfactorily calendered. The continuous series of overlapped primary sheets thus provided is then consolidated by means of a pair of calender rolls $d$—$d'$ to form a single continuous variegated sheet D of reduced thickness.

The composite sheet D may be applied in continuous lengths to a suitable backing such as burlap, saturated felt or the like. Usually, however, it will be employed with other sheets of plain or variegated color in the formation of block inlaid linoleum by means of the well-known automatic inlaying machines of the Walton or Batten type. When employed in the latter manner, the rejected blocks of the variegated sheet, resulting from the inlaying process, may be re-used for the formation of additional primary sheet material for one or more of the series of primary sheets above described. In re-using the rejected blocks, the variegated composition is preferably treated so as to blend the several colors into a single shade thus providing mono-colored composition for the formation of one of the series of primary sheets. If desired, however, the rejected blocks may be formed into primary sheets without so blending the colors, in which event a series of variegated primary sheets will result.

Having disclosed my invention, it will be obvious to those skilled in the art, that numerous variations may be made in the manner of selecting and arranging the primary sheets of the respective series, to give a variety of pleasing artistic effects in the final composite sheet, and I do not wish to limit my invention except as defined in the appended claims.

Claims:

1. The method of producing from plastic material, a sheet of continuous indefinite length, having a substantially uniform variegated effect from end to end, which comprises the steps of forming a plurality of series of differently colored primary sheets of plastic composition, the primary sheets of each series being of the same coloring but differing from the coloring of the primary sheets of another series; positioning, in predetermined order and in superimposed overlapping relation, primary sheets selected from the respective series to form a laminated sheet of a thickness substantially greater than that intended for the finished product and of continuous indefinite length; maintaining a continuous supply of said overlapping primary sheets; and consolidating the overlapping primary sheets to form a variegated sheet of reduced thickness and of continuous indefinite length.

2. The method of producing a sheet of linoleum of continuous indefinite length, having a substantially uniform variegated effect from end to end, which comprises the steps of forming a plurality of series of differently colored primary sheets of linoleum composition or the like, the primary sheets of each series being of the same coloring but differing from the coloring of the primary sheets of another series; positioning, in predetermined order and in superimposed overlapping relation, primary sheets selected from the respective series to form a laminated sheet of a thickness substantially greater than that intended for the finished product and of continuous indefinite length; maintaining a continuous supply of said overlapping primary sheets; and consolidating the overlapping primary sheets to form a variegated sheet of reduced thickness and of continuous indefinite length.

3. The method of producing a sheet of linoleum of continuous indefinite length, having a substantially uniform variegated effect from end to end, which comprises the steps of forming a plurality of series of differently colored primary sheets of linoleum composition or the like, the primary sheets of each series being of the same coloring but differing from the coloring of the primary sheets of another series and the sheets of at least one of said series being variegated; positioning, in predetermined order and in superimposed overlapping relation, primary sheets selected from the respective series to form a laminated sheet of a thickness substantially greater than that intended for the finished product and of continuous indefinite length; maintaining a continuous supply of said overlapping primary sheets; and consolidating the overlapping primary sheets to form a variegated sheet of reduced thickness and of continuous indefinite length.

4. The method of producing a sheet of linoleum of continuous indefinite length, having a substantially uniform variegated effect from end to end, which comprises the steps of forming a plurality of series of differently colored primary sheets of linoleum composition or the like, the primary sheets of each series being of the same coloring but differing from the coloring of the primary sheets of another series and the sheets of certain series being mono-colored and the sheets of certain other series being variegated; positioning, in predetermined order and in superimposed overlapping relation, primary sheets selected from the respective series to form a laminated sheet of a thickness substantially greater than that intended for the finished product and of continuous indefinite length; maintaining a continuous supply of said overlapping primary sheets; and consolidating the overlapping primary sheets to form a variegated sheet of reduced thickness and of continuous indefinite length.

In testimony whereof, I affix my signature.

JOHN B. THOMPSON.